US012776460B2

(12) United States Patent
Wu et al.

(10) Patent No.: US 12,776,460 B2
(45) Date of Patent: Oct. 27, 2026

(54) THREE-STAGE CONTROL MECHANISM OF EXPLOSION-PROOF SWITCH

(71) Applicants: SWITCHLAB INC., New Taipei City (TW); SWITCHLAB (SHANGHAI) CO., LTD., Shanghai City (CN); GAOCHENG ELECTRONICS CO., LTD., Guangdong Province (CN)

(72) Inventors: Chih-Yuan Wu, New Taipei City (TW); Wen-Bing Hsu, New Taipei City (TW)

(73) Assignees: SWITCHLAB INC., New Taipei City (TW); Switchlab (Shanghai) Co., Ltd., Shanghai City (CN); GAOCHENG ELECTRONICS CO., LTD., Shenzhen (CN)

(*) Notice: Subject to any disclaimer, the term of this patent is extended or adjusted under 35 U.S.C. 154(b) by 340 days.

(21) Appl. No.: 18/428,173

(22) Filed: Jan. 31, 2024

(65) Prior Publication Data

US 2024/0274380 A1 Aug. 15, 2024

(30) Foreign Application Priority Data

Feb. 10, 2023 (TW) ................................ 112201181

(51) Int. Cl.

| | |
|---|---|
| ***H01H 19/14*** | (2006.01) |
| ***H01H 9/04*** | (2006.01) |
| ***H01H 19/06*** | (2006.01) |
| ***H01H 19/46*** | (2006.01) |

(52) U.S. Cl.

CPC ............ *H01H 19/46* (2013.01); *H01H 9/045* (2013.01); *H01H 19/06* (2013.01); *H01H 19/14* (2013.01)

(58) Field of Classification Search

CPC ........ H01H 19/6355; H01H 3/32; H01H 3/42; H01H 3/02; H01H 9/042; H01H 9/22; H01H 3/20; H01H 9/04; H01H 19/14; H01H 9/045

See application file for complete search history.

(56) References Cited

U.S. PATENT DOCUMENTS 3,681,553 A * 8/1972 Lehman ................. H01H 13/06 200/302.1
9,343,243 B2 * 5/2016 Kondrus ................. H01H 3/20

* cited by examiner

*Primary Examiner* — Ahmed M Saeed
(74) *Attorney, Agent, or Firm* — Rosenberg, Klein & Lee

(57) ABSTRACT

A three-stage control mechanism of an explosion-proof switch has a rotating unit and an interconnecting unit. The rotating unit has a first drive portion and a second drive portion that are selectively operated and reciprocated. The interconnecting unit includes a retaining seat and a connecting member. A switch unit is connected to the connecting member. An intermediate sleeve is insertedly connected to the connecting member and extends into the retaining seat. An outer sleeve is tightly sleeved on an outer wall of the intermediate sleeve. The outer sleeve is in tight fit with the retaining seat. A movable cover is provided between the outer sleeve and the rotating unit. A connecting rod assembly includes a first connecting rod and a second connecting rod that are inserted in the intermediate sleeve. The first and second connecting rods are respectively driven by the first and second drive portions.

20 Claims, 6 Drawing Sheets

THREE-STAGE CONTROL MECHANISM OF EXPLOSION-PROOF SWITCH

FIELD OF THE INVENTION

The present invention relates to a three-stage control mechanism of an explosion-proof switch, and more particularly to an explosion-proof switch control mechanism which has different operation control functions and can prevent sparks from igniting external flammable materials when the contacts are in operation.

BACKGROUND OF THE INVENTION

For conventional electrical control mechanisms used in the high dust, high oil and gas and other explosive (flammable) environment, the switch contacts and interconnecting mechanisms of various control switches are disposed in a closed space within a housing, thereby forming an explosion-proof switch that prevents sparks from igniting flammable materials when the contacts are in operation.

Prior art discloses a typical explosion-proof switch structure, comprising a first connecting member and a second connecting member that are connected to each other, an actuating rod passing through the connecting members, a press member installed on the first connecting member and connected to the top of the actuating rod, a first elastic member sleeved on the actuating rod and held between the connecting members, at least one first sealing member, and at least one sealing unit. The second connecting member is disposed in a mounting hole. The first sealing member is disposed on one of the front and back sides of a safety door. The sealing unit is sleeved on the bottom of the actuating rod. The first sealing member and the sealing unit are configured to prevent sparks generated when a hidden button is operated from being emitted to the outside.

The above-mentioned explosion-proof switch structure has the press member to drive the first connecting member and the actuating rod to be reciprocated axially to move the second connecting member, thereby forming a control switching action of ON and OFF. However, in many explosive (flammable) environments, the control of electrical appliances is not limited to ON and OFF, but may include a variety of different mode switching options. Thus, the conventional explosion-proof switch structure mentioned above has become increasingly difficult to meet the needs of various more complex applications.

Accordingly, the inventor of the present invention has devoted himself based on his many years of practical experiences to solve these problems.

SUMMARY OF THE INVENTION

The primary object of the present invention is to provide a three-stage control mechanism of an explosion-proof switch, comprising a rotating unit and an interconnecting unit. The rotating unit includes a first drive portion and a second drive portion that are selectively operated and reciprocated. The interconnecting unit includes a retaining seat coupled to the rotating unit and a connecting member connected to the retaining seat. A switch unit is connected to the connecting member. An intermediate sleeve is insertedly connected to the connecting member and extends into the retaining seat. A connecting rod assembly includes a first connecting rod and a second connecting rod that are inserted in the intermediate sleeve. The first connecting rod is driven by the first drive portion, and the second connecting rod is driven by the second drive portion, thereby respectively linking the switch unit to perform a variety of different operating actions for more diverse control changes.

Another object of the present invention is to provide a three-stage control mechanism of an explosion-proof switch, wherein the switch unit includes a first switch, an intermediate switch and a second switch that are arranged in sequence. The first switch has a first touch portion. The second switch has a second touch portion. The intermediate switch has an intermediate touch portion. One end of the first connecting rod, facing the first switch, is coupled to a first interconnecting block. The first interconnecting block has a first intermediate pressing portion corresponding to the intermediate touch portion and a first side pressing portion corresponding to the first touch portion. One end of the second connecting rod, facing the second switch, is coupled to a second interconnecting block. The second interconnecting block has a second intermediate pressing portion corresponding to the intermediate touch portion and a second side pressing portion corresponding to the second touch portion. The intermediate switch is simultaneously driven to actuate while the first connecting rod and the second connecting rod drive the first switch and the second switch to actuate, respectively.

Another object of the present invention is to provide a three-stage control mechanism of an explosion-proof switch, wherein an outer sleeve is tightly sleeved on an outer wall of the intermediate sleeve. The outer sleeve is in tight fit with the retaining seat. A movable cover is provided between the outer sleeve and the rotating unit. With the foregoing assembled structure, a multiple separation structure is formed between the switch unit and the rotating unit to effectively prevent the sparks generated during the operation of the switch unit from igniting external flammable materials.

In order to achieve the foregoing objects and effects, the present invention provides a three-stage control mechanism of an explosion-proof switch, comprising a rotating unit and an interconnecting unit. The rotating unit includes a rotating knob to drive a first drive portion and a second drive portion that are juxtaposed and reciprocated in a same direction. The interconnecting unit includes a retaining seat, a connecting member, an intermediate sleeve, and a connecting rod assembly. The retaining seat is coupled to the rotating unit and secured on a preset work plane. The retaining seat has a central accommodating room therein. One end of the accommodating room communicates with and receives the first drive portion and the second drive portion. The connecting member is coupled to one end of the retaining seat, far away from the rotating unit. The connecting member has a central through hole therein. The central through hole communicates with the accommodating room. An opening is formed at one end of the central through hole, far away from the retaining seat. One end of the intermediate sleeve is inserted in the central through hole of the connecting member. The other end of the intermediate sleeve extends into the accommodating room of the retaining seat. The intermediate sleeve has a first guide hole and a second guide hole extending in parallel along an axial direction. The connecting rod assembly includes a first connecting rod and a second connecting rod. The first connecting rod and the second connecting rod are inserted in the first guide hole and the second guide hole of the intermediate sleeve, respectively. One end of the first connecting rod is connected to the first drive portion of the rotating unit. One end of the second connecting rod is connected to the second drive portion of the rotating unit. Another ends of the first connecting rod and the second connecting rod are driven by the first drive portion and the second drive portion to extend and retract toward one end having the opening of the connecting member.

Preferably, one end of the connecting member, far away from the retaining seat, is equipped with a switch unit. The switch unit is connected to the ends of the first connecting rod and the second connecting rod, far away from the rotating unit. The switch unit is touched by the first connecting rod and the second connecting rod to bring corresponding different control actions.

Preferably, the switch unit includes a first switch corresponding to the first connecting rod, a second switch corresponding to the second connecting rod, and an intermediate switch between the first switch and the second switch. The first switch has a first touch portion. The second switch has a second touch portion. The intermediate switch has an intermediate touch portion. The end of the first connecting rod, facing the first switch, is coupled to a first interconnecting block. The first interconnecting block has a first intermediate pressing portion corresponding to the intermediate touch portion and a first side pressing portion corresponding to the first touch portion. The end of the second connecting rod, facing the second switch, is coupled to a second interconnecting block. The second interconnecting block has a second intermediate pressing portion corresponding to the intermediate touch portion and a second side pressing portion corresponding to the second touch portion. The intermediate switch is simultaneously driven to actuate while the first connecting rod and the second connecting rod drive the first switch and the second switch to actuate, respectively.

Preferably, one end of the intermediate sleeve has a blocking flange configured to block the opening. The blocking flange has a groove extending transversely and passing through one end of the first guide hole and one end of the second guide hole. The first interconnecting block and the second interconnecting block are received in the groove.

Preferably, a first press block is provided between the end of the first connecting rod and the first drive portion. A first connecting rod spring is provided between the first guide hole of the intermediate sleeve and the first press block. A second press block is provided between the end of the second connecting rod and the second drive portion. A second connecting rod spring is provided between the second guide hole of the intermediate sleeve and the second press block.

Preferably, a movable cover is provided in the accommodating room and is located between the intermediate sleeve and the rotating unit. The movable cover has a first connecting rod hole and a second connecting rod hole for insertion of the first connecting rod and the second connecting rod.

Preferably, one side of the movable cover, far away from the intermediate sleeve, has a transverse groove. The transverse groove communicates with the first connecting rod hole and the second connecting rod hole. The first press block and the second press block are received in the transverse groove. One end of the intermediate sleeve, facing the movable cover, has at least one positioning protrusion. The movable cover further has a positioning hole corresponding to the positioning protrusion.

Preferably, an outer sleeve is tightly sleeved on an outer wall of the intermediate sleeve. One end of the accommodating room, far away from the rotating unit, has a lower guide hole. The outer sleeve is in tight fit with the lower guide hole. A middle section of the outer sleeve has an annular flange. A sleeve spring is provided between the annular flange and the movable cover to elastically press against the movable cover.

Preferably, one end of the retaining seat, facing the connecting member, has a lower protruding portion extending into the central through hole, so that the connecting member is coupled to the retaining seat.

Preferably, a first internal thread is formed on an inner wall of the accommodating room. A first external thread is formed on the rotating unit. The first external thread of the rotating unit is threadedly connected to the first internal thread. A second external thread is formed on an outer wall of the retaining seat for engagement of a retaining member having a corresponding second internal thread, so as to secure the retaining seat to the preset work plane.

Embodiments of the present invention will now be described, by way of example only, with reference to the accompanying drawings.

DETAILED DESCRIPTION OF THE PREFERRED EMBODIMENTS

Figure 1:
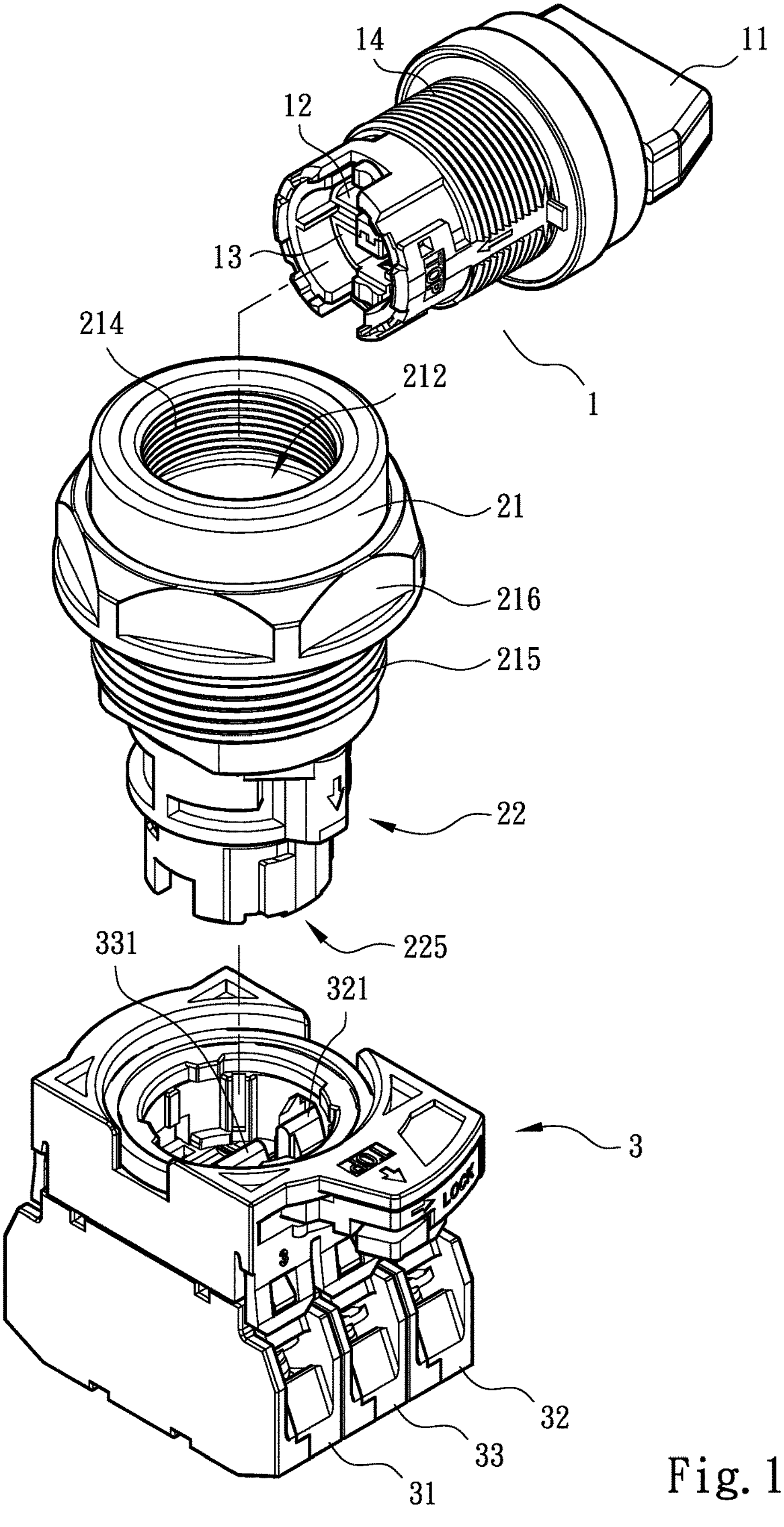
FIG. 1 is an exploded view of the present invention.
Figure 2:
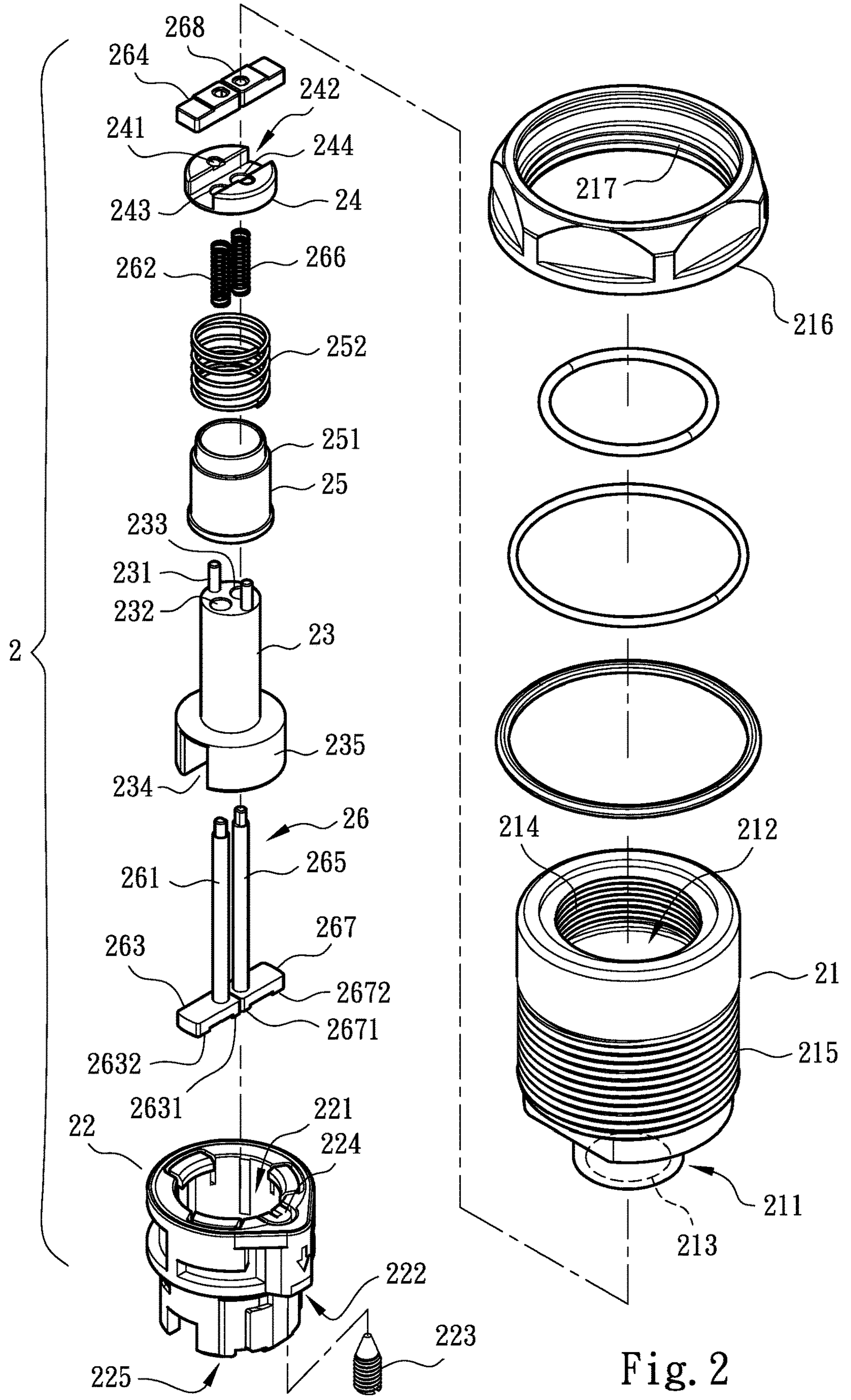
FIG. 2 is a partial exploded view of the present invention.
Figure 3:
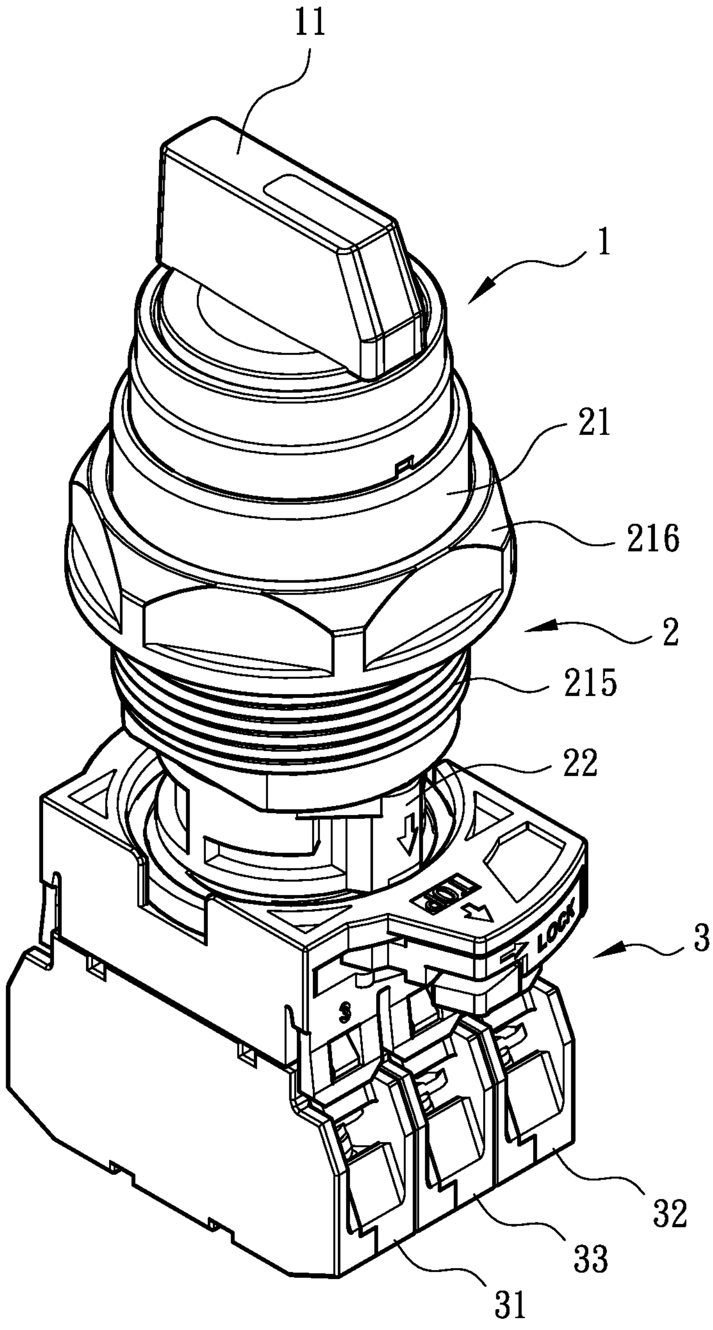
FIG. 3 is a perspective view of the present invention.

Referring to FIG. 1 through FIG. 4, the present invention discloses a three-stage control mechanism of an explosion-proof switch, comprising a rotating unit 1 and an interconnecting unit 2. The rotating unit 1 includes a rotating knob 11 that can be rotated by operation. The rotating knob 11 drives a first drive portion 12 and a second drive portion 13 that are juxtaposed and reciprocated in the same direction. A first external thread 14 is formed on the outer wall of the rotating unit 1 as required.

The interconnecting unit 2 includes a retaining seat 21, a connecting member 22, an intermediate sleeve 23, a movable cover 24, and a connecting rod assembly 26. A second external thread 215 is formed on the outer wall of the retaining seat 21 for engagement of a retaining member 216 having a corresponding second internal thread 217, so as to secure the retaining seat 21 to a preset work plane (e.g., a control panel).

The retaining seat 21 has a central accommodating room 212 therein. A first internal thread 214 is formed on the inner wall of one end of the accommodating room 212. The first external thread 14 of the rotating unit 1 is threadedly connected to the first internal thread 214, so that the accommodating room 212 accommodates one end having the first drive portion 12 and the second drive portion 13 of the rotating unit 1. One end of the retaining seat 21, far away from the first internal thread 214 (the rotating unit 1), has a lower protruding portion 211. The lower protruding portion 211 has a lower guide hole 213 therein. The lower guide hole 213 communicates with the accommodating room 212.

The connecting member 22 has a central through hole 221 therein. The lower protruding portion 211 is fitted into the central through hole 221, so that the connecting member 22 is coupled to one end of the retaining seat 21, far away from the rotating unit 1, for connecting a switch unit 3. The central through hole 221 communicates with the lower guide hole 213. An opening 225 is formed at one end of the central through hole 221, far away from the retaining seat 21. In this embodiment, the switch unit 3 includes a first switch 31, an intermediate switch 33 and a second switch 32 that are arranged in sequence. The first switch 31 has a first touch portion 311. The second switch 32 has a second touch portion 321. The intermediate switch 33 has an intermediate touch portion 331.

In a feasible embodiment, the outside of the connecting member 22 has a tightening hole 222 (which may be a screw hole) extending in the same direction as the central through hole 221. A tightening portion 224 is provided inside the central through hole 221 and connected to the tightening hole 222. A tightening member 223 (which may be a bolt) is provided and inserted into the tightening hole 222 to push the tightening portion 224 against the outside of the lower protruding portion 211, so that the connecting member 22 is coupled to the retaining seat 21.

The intermediate sleeve 23 is disposed in the central through hole 221 of the connecting member 22. One end of the intermediate sleeve 23 has a blocking flange 235 expanding outwardly. The blocking flange 235 is configured to block the opening 225. The other end of the intermediate sleeve 23 extends into the accommodating room 212 of the retaining seat 21. The intermediate sleeve 23 has a first guide hole 232 and a second guide hole 233 extending in parallel along an axial direction.

In a feasible embodiment, the blocking flange 235 has a groove 234 extending transversely and passing through one end of the first guide hole 232 and one end of the second guide hole 233. The intermediate sleeve 23 has at least one positioning protrusion 231 protruding from one end of the intermediate sleeve 23, far away from the blocking flange 235.

The movable cover 24 is disposed in the accommodating room 212, and is located between the intermediate sleeve 23 and the rotating unit 1. The movable cover 24 has a first connecting rod hole 243 and a second connecting rod hole 244 corresponding to the first guide hole 232 and the second guide hole 233, respectively. The movable cover 24 further has at least one positioning hole 241 for receiving the positioning protrusion 231 of the intermediate sleeve 23. An outer sleeve 25 and a sleeve spring 252 sleeved on the outer sleeve 25 are pivoted to the intermediate sleeve 23, forming an elastic guide structure. One side of the movable cover 24, far away from the intermediate sleeve 23, has a transverse groove 242. The transverse groove 242 communicates with the first connecting rod hole 243 and the second connecting rod hole 244.

The connecting rod assembly 26 has a first connecting rod 261 and a second connecting rod 265. The first connecting rod 261 and the second connecting rod 265 are inserted in the first guide hole 232 and the second guide hole 233 of the intermediate sleeve 23, respectively. One end of the first connecting rod 261 passes through the first connecting rod hole 243 of the movable cover 24 and is (welded) coupled to a first press block 264. The first press block 264 is received in the transverse groove 242, which restricts the intermediate sleeve 23 from rotating and forms a guide for the first connecting rod 261 to extend and retract. The first press block 264 is pressed by the first drive portion 12 of the rotating unit 1. A first connecting rod spring 262 is provided between the first guide hole 232 of the intermediate sleeve 23 and the first press block 264. One end of the second connecting rod 265 passes through the second connecting rod hole 244 of the movable cover 24 and is (welded) coupled to a second press block 268. The second press block 268 is received in the transverse groove 242, which restricts the intermediate sleeve 23 from rotating and forms a guide for the second connecting rod 265 to extend and retract. The second press block 268 is pressed by the second drive portion 13 of the rotating unit 1. A second connecting rod spring 266 is provided between the second guide hole 233 of the intermediate sleeve 23 and the second press block 268.

In the above structure, one end of the first connecting rod 261, far away from the first press block 264, is (welded) coupled to a first interconnecting block 263. The first interconnecting block 263 is received in the groove 234. The groove 234 restricts the first interconnecting block 263 (the first connecting rod 261) from rotating and guides the first interconnecting block 263 to move back and forth in the groove 234. The first interconnecting block 263 has a first intermediate pressing portion 2631 corresponding to the intermediate touch portion 331 and a first side pressing portion 2632 corresponding to the first touch portion 311. One end of the second connecting rod 265, far away from the second press block 268, is (welded) coupled to a second interconnecting block 267. The second interconnecting block 267 is received in the groove 234. The groove 234 restricts the second interconnecting block 267 (the second connecting rod 265) from rotating and guides the second interconnecting block 267 to move back and forth in the groove 234. The second interconnecting block 267 has a second intermediate pressing portion 2671 corresponding to the intermediate touch portion 331 and a second side pressing portion 2672 corresponding to the second touch portion 321.

In a feasible embodiment, the outer sleeve 25 is in tight fit with the lower guide hole 213. The middle section of the outer wall of the outer sleeve 25 has an annular flange 251. The sleeve spring 252 (having an elastic coefficient greater than that of the first connecting rod spring 262 and the second connecting rod spring 266) is disposed between the annular flange 251 and the movable cover 24 to elastically press against the movable cover 24.

Figure 4:
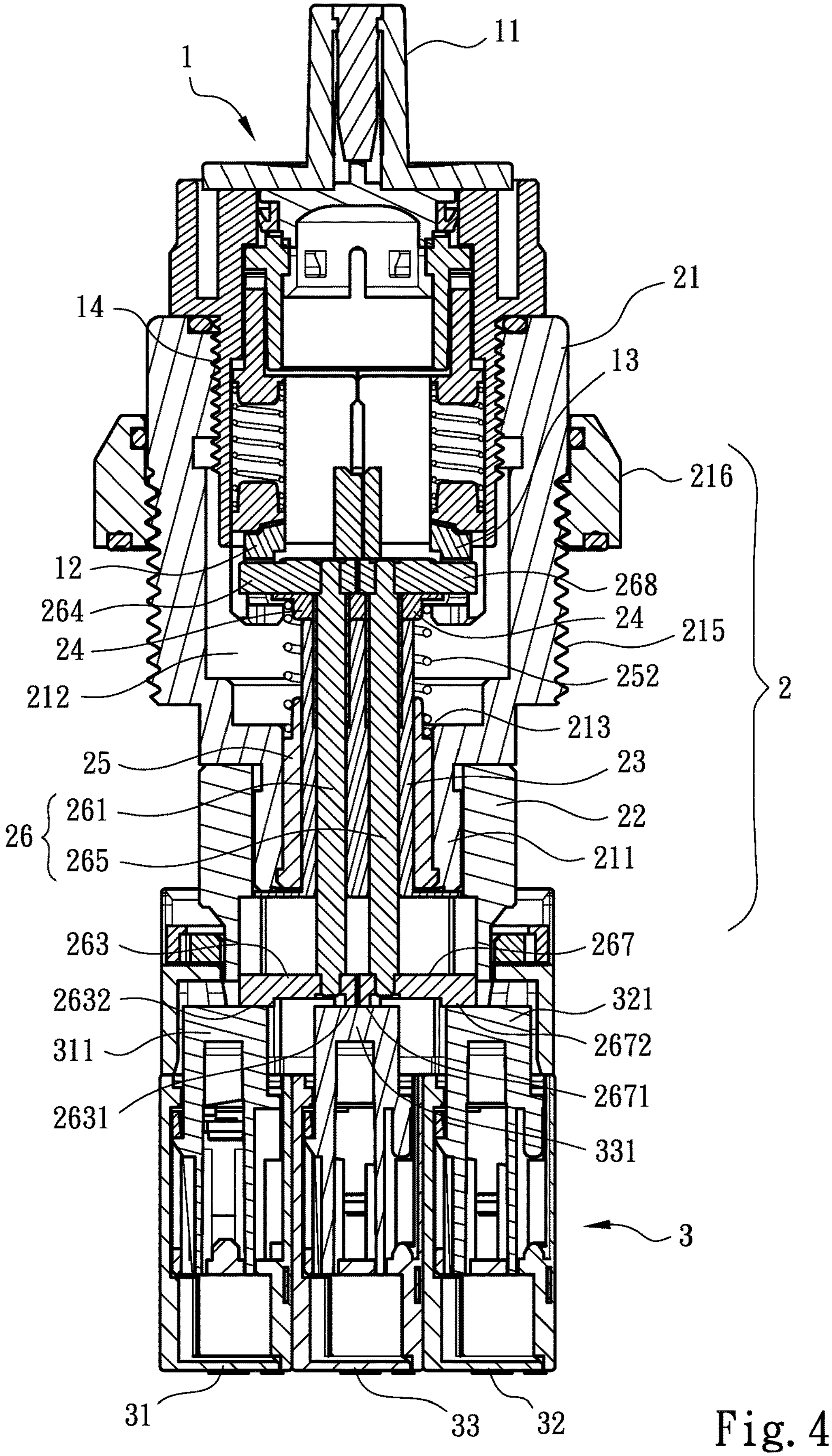
FIG. 4 is a schematic view of the present invention in an initial state.
Figure 5:
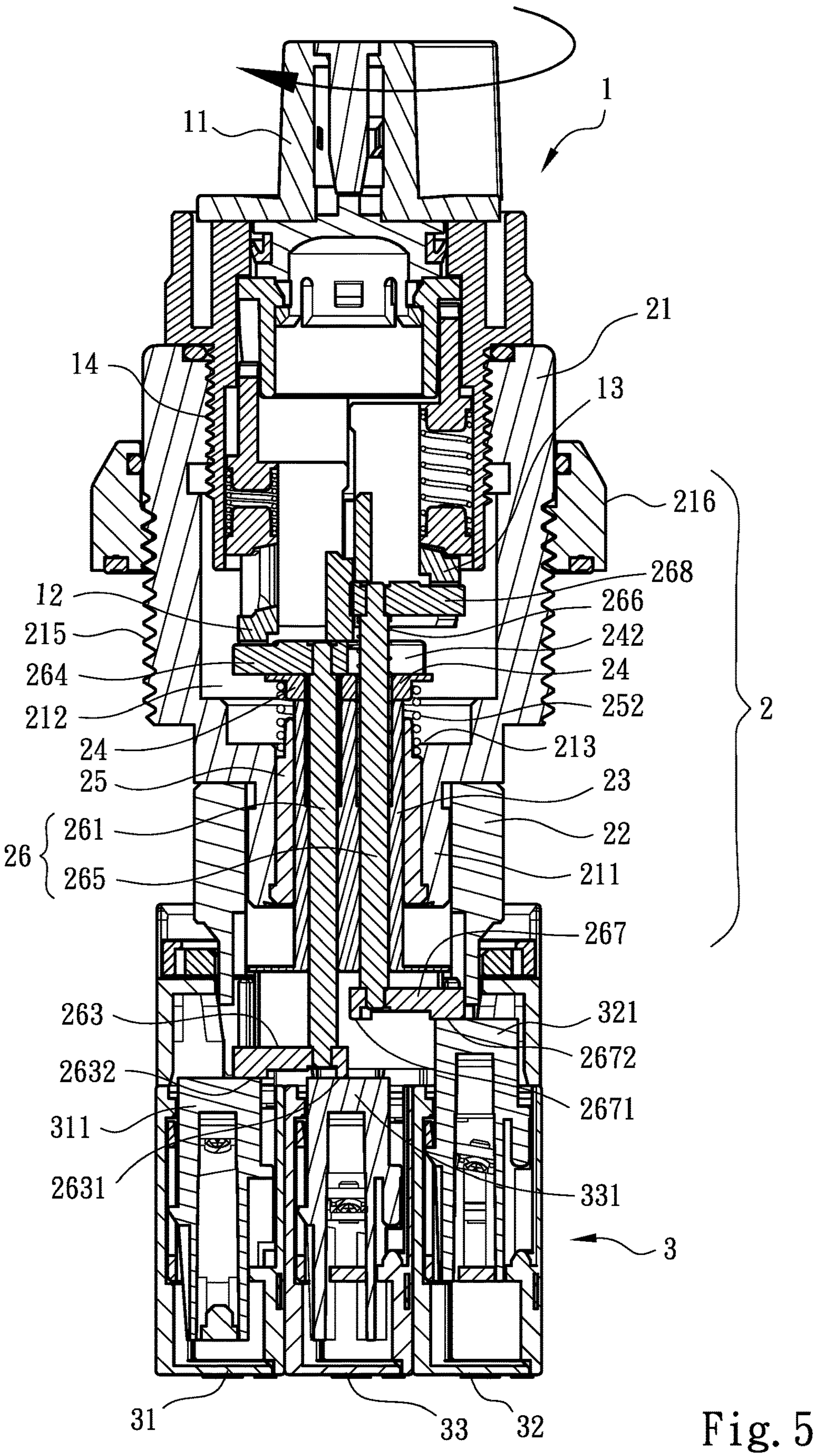
FIG. 5 is a schematic view of the present invention in an operating state.
Figure 6:
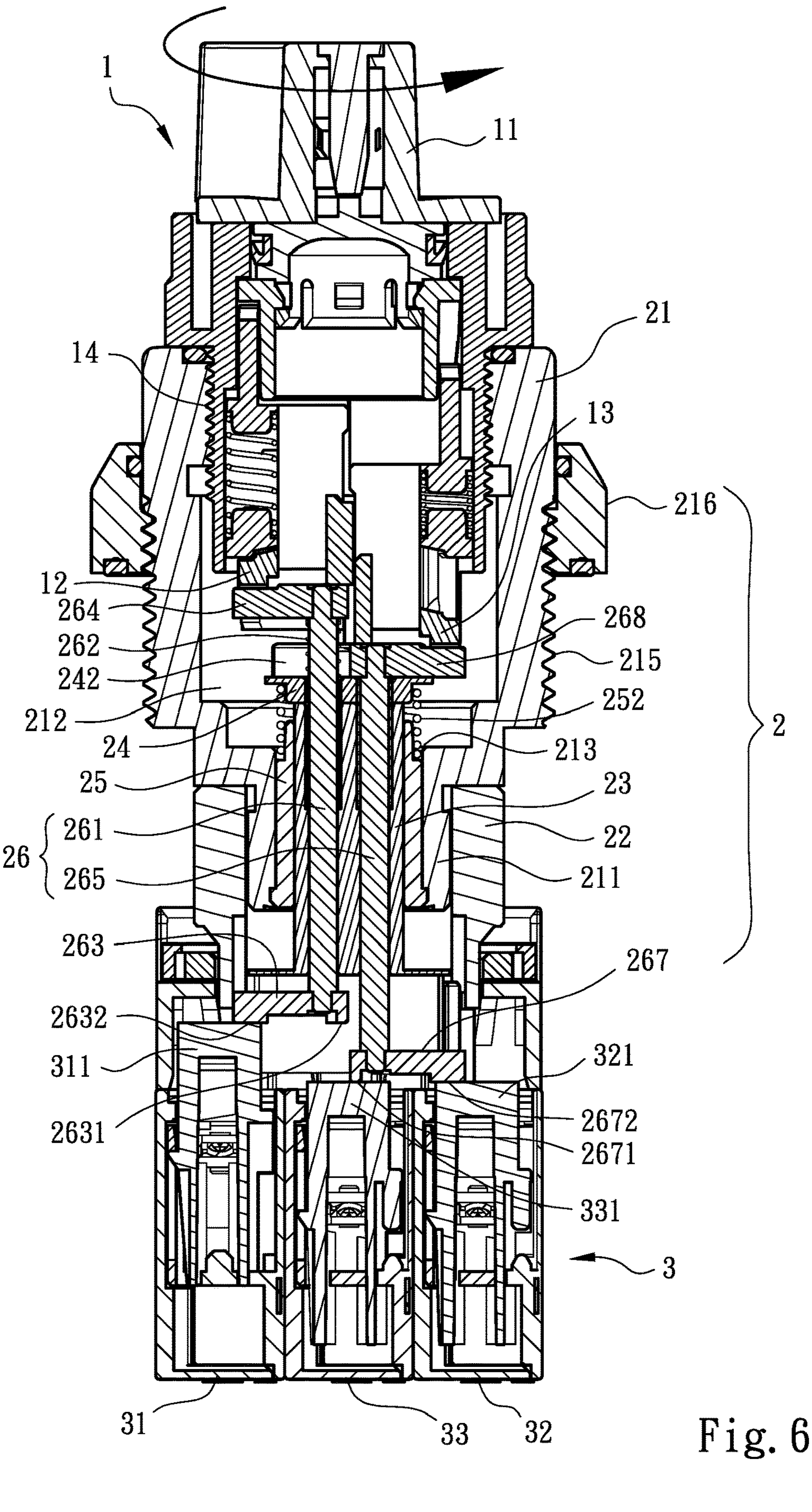
FIG. 6 is another schematic view of the present invention in an operating state.

Referring to FIG. 4 through FIG. 6, in operation, when the rotating knob 11 of the rotating unit 1 is not rotated by force, the first drive portion 12 and the second drive portion 13 are both in an inactive, retracted position, and the switch unit 3 is in an untouched, initial state (as shown in FIG. 4).

When the rotating knob 11 is rotated in a preset direction (e.g., clockwise), the second drive portion 13 is not actuated, and the first drive portion 12 is pressed against the first press block 264 to move the first connecting rod 261 (to compress the first connecting rod spring 262), and the movable cover 24 is moved to compress the sleeve spring 252. At this time, the first connecting rod 261 can synchronously touch the first touch portion 311 and the intermediate touch portion 331 via the first interconnecting block 263, so that the first switch 31 and the intermediate switch 33 are turned on at the same time (as shown in FIG. 5). The second connecting rod spring 266 is against the second press block 268 to keep the second connecting rod 265 in a non-pressed position for a preset control operation of a connected device (not shown).

When the rotating knob 11 is rotated in a preset reverse direction (e.g., counterclockwise), the first drive portion 12 is not actuated, and the second drive portion 13 is pressed against the second press block 268 to move the second connecting rod 265 (to compress the second connecting rod spring 266), and the movable cover 24 is moved to compress the sleeve spring 252. At this time, the second connecting rod 265 can synchronously touch the second touch portion

321 and the intermediate touch portion 331 via the second interconnecting block 267, so that the second switch 32 and the intermediate switch 33 are turned on at the same time (as shown in FIG. 6). The first connecting rod spring 262 is against the first press block 264 to keep the first connecting rod 261 in a non-pressed position for another preset control operation of the connected device. No matter whether the first connecting rod 261 or the second connecting rod 265 is moved, the intermediate touch portion 331 (the intermediate switch 33) can be driven at the same time, thereby forming different control functions in multiple phases and allowing the intermediate switch 33 to have the effect of collinear conduction.

In the above structure, the blocking flange 235 of the intermediate sleeve 23 blocks the opening 225 of the connecting member 22, the outer sleeve 25 is tightly coupled between the intermediate sleeve 23 and the central through hole 221, the first connecting rod 261 and the second connecting rod 265 are closely connected to the first guide hole 232 and the second guide hole 233, the first interconnecting block 263 and the second interconnecting block 267 are received in the groove 234, and the first press block 264 and the second press block 268 are received in the transverse groove 242, such that a multiple separation structure is formed between the switch unit 3 and the rotating unit 1 to effectively prevent the sparks generated during the operation of the first switch 31, the intermediate switch 33 and the second switch 32 from igniting external flammable materials, so as to achieve the predefined explosion-proof function.

The three-stage control mechanism of the explosion-proof switch provided by the present invention can achieve a variety of different operation control modes and prevent spark leakage when the contacts are in operation. Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A three-stage control mechanism of an explosion-proof switch, comprising a rotating unit (1) and an interconnecting unit (2); characterized by: the rotating unit (1) including a rotating knob (11) to drive a first drive portion (12) and a second drive portion (13) that are juxtaposed and reciprocated in a same direction; the interconnecting unit (2) including:

a retaining seat (21) coupled to the rotating unit (1) and secured on a preset work plane, the retaining seat (21) having a central accommodating room (212) therein, one end of the accommodating room (212) receiving the first drive portion (12) and the second drive portion (13);

a connecting member (22) coupled to one end of the retaining seat (21) opposite the rotating unit (1), the connecting member (22) having a central through hole (221) therein, the central through hole (221) communicating with the accommodating room (212), an opening (225) being formed at one end of the central through hole (221) opposite the retaining seat (21);

an intermediate sleeve (23) having one end inserted in the central through hole (221) of the connecting member (22) and another end extending into the accommodating room (212) of the retaining seat (21), the intermediate sleeve (23) having a first guide hole (232) and a second guide hole (233) extending in parallel to the first guide hole (232) along an axial direction through the intermediate sleeve (23);

a connecting rod assembly (26), including a first connecting rod (261) and a second connecting rod (265), the first connecting rod (261) and the second connecting rod (265) being inserted in the first guide hole (232) and the second guide hole (233) of the intermediate sleeve (23) respectively, one end of the first connecting rod (261) being connected to the first drive portion (12) of the rotating unit (1), one end of the second connecting rod (265) being connected to the second drive portion (13) of the rotating unit (1); wherein an opposite end of the first connecting rod (261) and an opposite end of the second connecting rod (265) are respectively driven by the first drive portion (12) and the second drive portion (13) to extend and retract toward one end having the opening (225) of the connecting member (22).

2. The three-stage control mechanism of the explosion-proof switch as claimed in claim 1, wherein one end of the connecting member (22), opposite the retaining seat (21), is equipped with a switch unit (3), the switch unit (3) is connected to the opposite end of the first connecting rod (261) and the opposite end of the second connecting rod (265) opposite the rotating unit (1), and the switch unit (3) is touched by the first connecting rod (261) and the second connecting rod (265) to bring corresponding different control actions.

3. The three-stage control mechanism of the explosion-proof switch as claimed in claim 2, wherein the switch unit (3) includes a first switch (31) corresponding to the first connecting rod (261), a second switch (32) corresponding to the second connecting rod (265), and an intermediate switch (33) between the first switch (31) and the second switch (32); the first switch (31) has a first touch portion (311), the second switch (32) has a second touch portion (321), the intermediate switch (33) has an intermediate touch portion (331); the end of the first connecting rod (261), facing the first switch (31), is coupled to a first interconnecting block (263), the first interconnecting block (263) has a first intermediate pressing portion (2631) corresponding to the intermediate touch portion (331) and a first side pressing portion (2632) corresponding to the first touch portion (311); the end of the second connecting rod (265), facing the second switch (32), is coupled to a second interconnecting block (267), the second interconnecting block (267) has a second intermediate pressing portion (2671) corresponding to the intermediate touch portion (331) and a second side pressing portion (2672) corresponding to the second touch portion (321); the intermediate switch (33) is simultaneously driven to actuate while the first connecting rod (261) and the second connecting rod (265) drive the first switch (31) and the second switch (32) to actuate, respectively.

4. The three-stage control mechanism of the explosion-proof switch as claimed in claim 3, wherein one end of the intermediate sleeve (23) has a blocking flange (235) configured to block the opening (225), the blocking flange (235) has a groove (234) extending transversely and passing through one end of the first guide hole (232) and one end of the second guide hole (233), and the first interconnecting block (263) and the second interconnecting block (267) are received in the groove (234).

5. The three-stage control mechanism of the explosion-proof switch as claimed in claim 3, wherein a first press block (264) is provided between the end of the first connecting rod (261) and the first drive portion (12), a first connecting rod spring (262) is provided between the first guide hole (232) of the intermediate sleeve (23) and the first press block (264); a second press block (268) is provided between the end of the second connecting rod (265) and the second drive portion (13), and a second connecting rod spring (266) is provided between the second guide hole (233) of the intermediate sleeve (23) and the second press block (268).

6. The three-stage control mechanism of the explosion-proof switch as claimed in claim 1, wherein a movable cover (24) is provided in the accommodating room (212) and is located between the intermediate sleeve (23) and the rotating unit (1), and the movable cover (24) has a first connecting rod hole (243) and a second connecting rod hole (244) for insertion of the first connecting rod (261) and the second connecting rod (265).

7. The three-stage control mechanism of the explosion-proof switch as claimed in claim 2, wherein a movable cover (24) is provided in the accommodating room (212) and is located between the intermediate sleeve (23) and the rotating unit (1), and the movable cover (24) has a first connecting rod hole (243) and a second connecting rod hole (244) for insertion of the first connecting rod (261) and the second connecting rod (265).

8. The three-stage control mechanism of the explosion-proof switch as claimed in claim 3, wherein a movable cover (24) is provided in the accommodating room (212) and is located between the intermediate sleeve (23) and the rotating unit (1), and the movable cover (24) has a first connecting rod hole (243) and a second connecting rod hole (244) for insertion of the first connecting rod (261) and the second connecting rod (265).

9. The three-stage control mechanism of the explosion-proof switch as claimed in claim 5, wherein a movable cover (24) is provided in the accommodating room (212) and is located between the intermediate sleeve (23) and the rotating unit (1), and the movable cover (24) has a first connecting rod hole (243) and a second connecting rod hole (244) for insertion of the first connecting rod (261) and the second connecting rod (265), wherein one side of the movable cover (24), opposite the intermediate sleeve (23), has a transverse groove (242), the transverse groove (242) communicates with the first connecting rod hole (243) and the second connecting rod hole (244), the first press block (264) and the second press block (268) are received in the transverse groove (242); one end of the intermediate sleeve (23), facing the movable cover (24), has at least one positioning protrusion (231), and the movable cover (24) further has a positioning hole (241) corresponding to the positioning protrusion (231).

10. The three-stage control mechanism of the explosion-proof switch as claimed in claim 1, wherein an outer sleeve (25) is tightly sleeved on an outer wall of the intermediate sleeve (23), one end of the accommodating room (212), opposite the rotating unit (1), has a lower guide hole (213), and the outer sleeve (25) is in tight fit with the lower guide hole (213).

11. The three-stage control mechanism of the explosion-proof switch as claimed in claim 2, wherein an outer sleeve (25) is tightly sleeved on an outer wall of the intermediate sleeve (23), one end of the accommodating room (212), opposite the rotating unit (1), has a lower guide hole (213), and the outer sleeve (25) is in tight fit with the lower guide hole (213).

12. The three-stage control mechanism of the explosion-proof switch as claimed in claim 3, wherein an outer sleeve (25) is tightly sleeved on an outer wall of the intermediate sleeve (23), one end of the accommodating room (212), opposite the rotating unit (1), has a lower guide hole (213), and the outer sleeve (25) is in tight fit with the lower guide hole (213).

13. The three-stage control mechanism of the explosion-proof switch as claimed in claim 6, wherein an outer sleeve (25) is tightly sleeved on an outer wall of the intermediate sleeve (23), one end of the accommodating room (212), opposite the rotating unit (1), has a lower guide hole (213), the outer sleeve (25) is in tight fit with the lower guide hole (213); a middle section of the outer sleeve (25) has an annular flange (251), and a sleeve spring (252) is provided between the annular flange (251) and the movable cover (24) to elastically press against the movable cover (24).

14. The three-stage control mechanism of the explosion-proof switch as claimed in claim 7, wherein an outer sleeve (25) is tightly sleeved on an outer wall of the intermediate sleeve (23), one end of the accommodating room (212), opposite the rotating unit (1), has a lower guide hole (213), the outer sleeve (25) is in tight fit with the lower guide hole (213); a middle section of the outer sleeve (25) has an annular flange (251), and a sleeve spring (252) is provided between the annular flange (251) and the movable cover (24) to elastically press against the movable cover (24).

15. The three-stage control mechanism of the explosion-proof switch as claimed in claim 8, wherein an outer sleeve (25) is tightly sleeved on an outer wall of the intermediate sleeve (23), one end of the accommodating room (212), opposite the rotating unit (1), has a lower guide hole (213), the outer sleeve (25) is in tight fit with the lower guide hole (213); a middle section of the outer sleeve (25) has an annular flange (251), and a sleeve spring (252) is provided between the annular flange (251) and the movable cover (24) to elastically press against the movable cover (24).

16. The three-stage control mechanism of the explosion-proof switch as claimed in claim 1, wherein one end of the retaining seat (21), facing the connecting member (22), has a lower protruding portion (211) extending into the central through hole (221), so that the connecting member (22) is coupled to the retaining seat (21).

17. The three-stage control mechanism of the explosion-proof switch as claimed in claim 2, wherein one end of the retaining seat (21), facing the connecting member (22), has a lower protruding portion (211) extending into the central through hole (221), so that the connecting member (22) is coupled to the retaining seat (21).

18. The three-stage control mechanism of the explosion-proof switch as claimed in claim 3, wherein one end of the retaining seat (21), facing the connecting member (22), has a lower protruding portion (211) extending into the central through hole (221), so that the connecting member (22) is coupled to the retaining seat (21).

19. The three-stage control mechanism of the explosion-proof switch as claimed in claim 1, wherein a first internal thread (214) is formed on an inner wall of the accommodating room (212), a first external thread (14) is formed on the rotating unit (1), the first external thread (14) of the rotating unit (1) is threadedly connected to the first internal thread (214); a second external thread (215) is formed on an outer wall of the retaining seat (21) for engagement of a retaining member (216) having a corresponding second internal thread (217), so as to secure the retaining seat (21) to the preset work plane.

20. The three-stage control mechanism of the explosion-proof switch as claimed in claim 2, wherein a first internal thread (214) is formed on an inner wall of the accommodating room (212), a first external thread (14) is formed on the rotating unit (1), the first external thread (14) of the rotating unit (1) is threadedly connected to the first internal thread (214); a second external thread (215) is formed on an outer wall of the retaining seat (21) for engagement of a retaining member (216) having a corresponding second internal thread (217), so as to secure the retaining seat (21) to the preset work plane.

* * * * *